Sept. 18, 1934. E. P. OSWALD 1,974,344
INDUCTION MOTOR
Filed Dec. 8, 1932 2 Sheets-Sheet 1
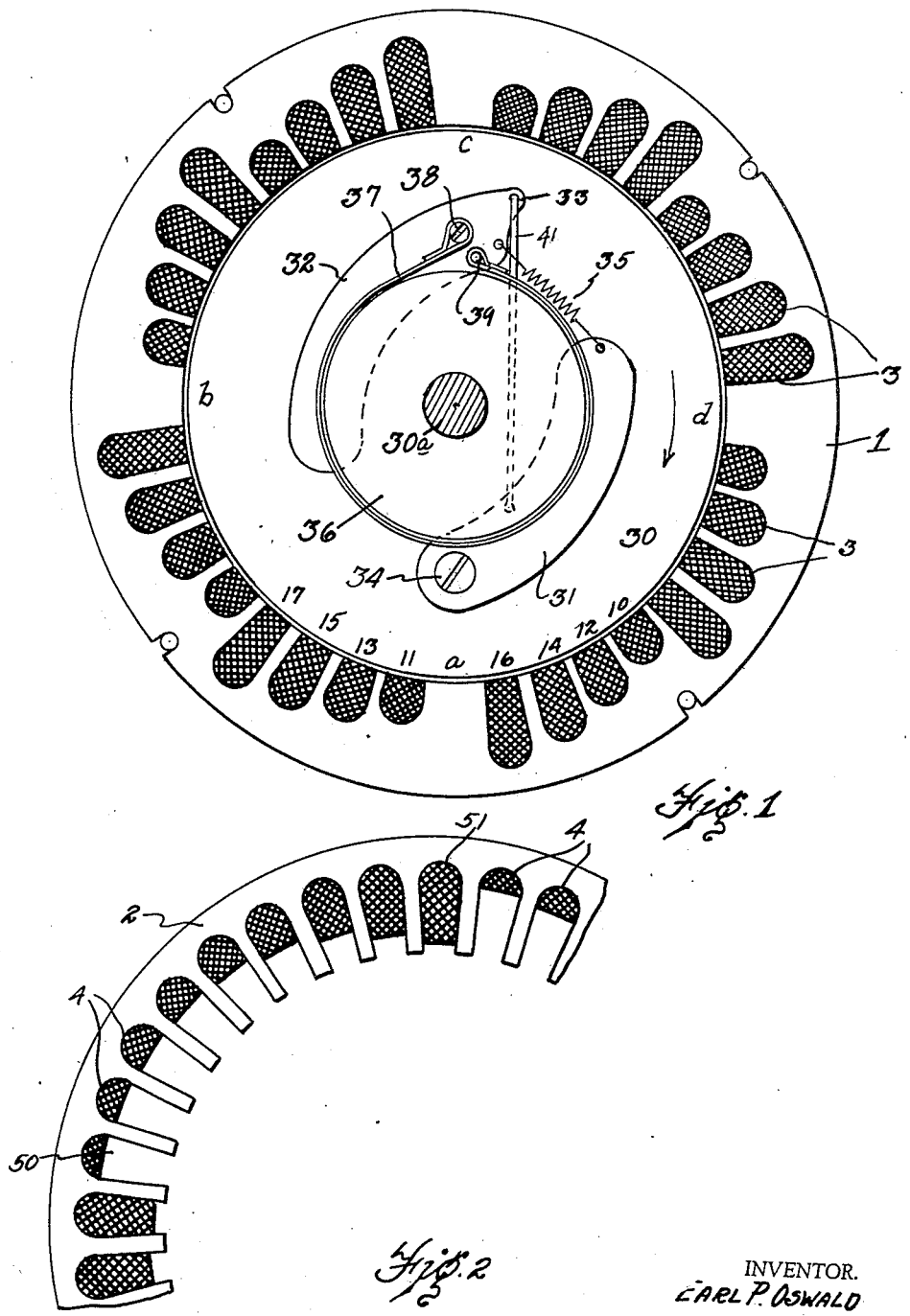
INVENTOR.
CARL P. OSWALD
BY
ATTORNEY.

Sept. 18, 1934.  E. P. OSWALD  1,974,344
INDUCTION MOTOR
Filed Dec. 8, 1932   2 Sheets-Sheet 2

INVENTOR.
EARL P. OSWALD
BY
ATTORNEY.

UNITED STATES PATENT OFFICE 1,974,344

INDUCTION MOTOR

Earl P. Oswald, Oak Park, Mich., assignor of three-fourths to Harriett Oswald and one-fourth to Charles E. Wisner, both of Oak Park, Mich.

Application December 8, 1932, Serial No. 646,290

7 Claims. (Cl. 172—278)

This invention relates to improvements in alternating current motors, its object being to provide such motor wound with a single field coil productive of polyphase effect by the current alternations and dispensing with the use of a starting coil, commutator, condenser or like instrumentalities heretofore required in such motors.

The principal feature of the invention resides in the provision of a single field winding which is so wound or of such character that, due to the current alternations, a constant displacement of the center of magnetic pressure at each pole is provided to thereby provide both the starting and the running torque and further permitting all the field space to be utilized for the said single winding.

It is also an object of the invention to provide a structurally simplified motor less expensive to construct and of higher torque when at normal speed than has heretofore been attained in motors of the same size or rated horsepower.

These various objects and novel features of construction are hereinafter more fully described and claimed, and the preferred form of construction of an alternating current motor embodying my invention is shown in the accompanying drawings in which—

Fig. 1 is a cross section of a motor showing one form thereof.

Fig. 2 is a similar partial section showing a different form of stator and field winding.

In a four pole motor of the alternating current type, there is a rotor and a stator which consists of a series of ring plates 1 of Fig. 1, or 2 of Fig. 2. These plates, as shown in Fig. 1, are provided with a series of radial slots 3 in their inner edges which vary in depth or may be of the common form as shown at 4 in Fig. 2 in which the slots are all of the same depth. These plates of Fig. 1 are shown as preferably being provided with thirty-two slots or eight for each pole while a common form of construction of such plates is with thirty-six slots of equal depth as shown in Fig. 2. In both forms of the construction illustrated in Figs. 1 and 2, the motor is a four-pole type and each pole is provided with a series of slots, eight in number in Fig. 1 and nine in number in Fig. 2. The teeth formed by these slots are of equal pole face area while the winding in the slots of each pole piece of the structure shown in Fig. 1 is in two groups. Each pole piece is separated from an adjacent pole piece by a pole face greater in width than the width of the teeth between the slots of each pole. In Fig. 2 the pole represented by the nine slots from 50 to 51 are separated from the next pole by a pole face of substantially the same width as the teeth of each pole.

The principal feature of the invention resides in the manner in which the coils are laid in the slots, and the principal difference between the form of the plates shown in Fig. 1 and that shown in Fig. 2 is that in Fig. 1 more iron is provided in the field and a somewhat increased magnetic effect is produced.

The single field winding is arranged in a coil for each of the poles so wound that the center of magnetic intensity is caused to shift circumferentially of the stator in the direction in which it is desired that the rotor shall turn due to the alternations in the supplied current, the sections constituting each coil being so varied in ampere turns as to produce greater reluctance of the iron at successive points toward one side of a pole to change in polarity. Therefore change in the position of the center of magnetic intensity is continually induced by the change in polarity of the supplied current.

Figure 3:
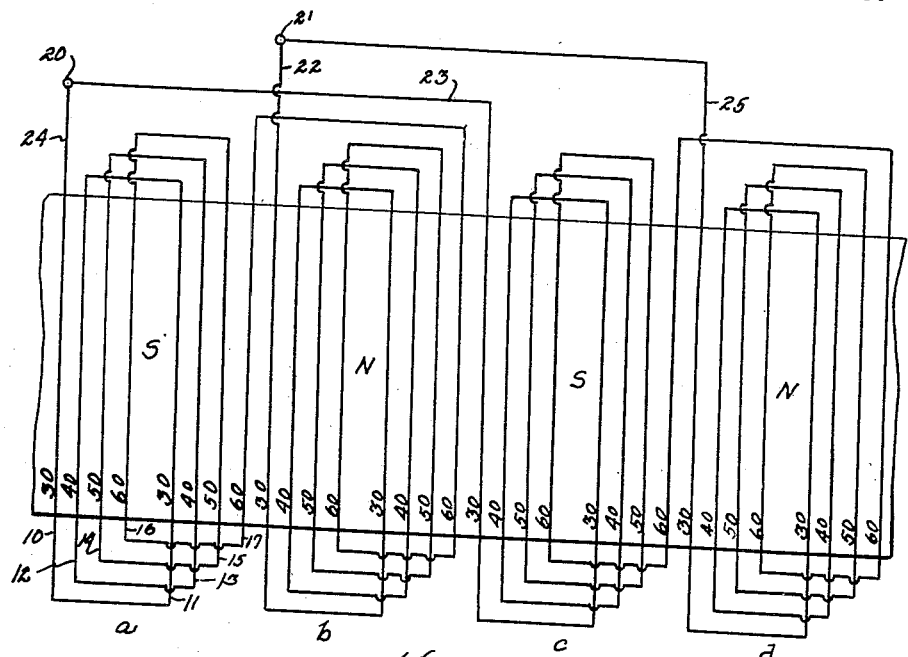
Fig. 3 is a diagram of the preferred character of winding wherein the motor may be wound with a single coil with the sectors either in series or in parallel.

Consider first the diagram of Fig. 3. The four poles or sectors are shown in plan as $a$, $b$, $c$ and $d$ in Fig. 3, the centers of which are suitably lettered to indicate the sectors in Fig. 1.

The coils for the several sectors are wound to provide south and north poles, the sector $a$ being a south pole, $b$ a north pole, $c$ a south pole and $d$ a north pole but each of the sectors are wound alike in respect to the number of turns constituting the coil and the arrangement of the successive turns.

The stator is provided with slots to receive the coil sections and in the form shown in Fig. 1 the magnetic poles are each formed with eight slots numbered in pairs. As an example of the winding for a pole, the slots numbered 10 and 11 of the pole $a$ contain thirty conductors, the slots numbered 12 and 13, forty conductors, the slots 14 and 15 contain fifty conductors and the slots 16 and 17 contain sixty conductors.

The lines representing the coil sections for each pole in Fig. 3 are likewise numbered for the sake of clarity and also bear numbers indicating the number of conductors comprising said coil sections.

This will be understood more clearly from Figs. 1 and 2 and each of the poles are alike, being wound in the same manner except that they are consecutively wound in reverse direction, but it is to be understood that the number of conductors in each of the slots may be varied without departing from the spirit of this invention although I have found that the specific number of conductors above designated give a very satisfactory result. These sectors or poles a, b, c, d, wound as stated may be connected together in a manner indicated in full lines in Fig. 3 to the contacts 20 and 21, the coils of sectors a and c being both connected to the contact 20 while the coils of the sectors b and d are connected to the terminal 21. To connect the same in series the line 22 from the sector b may be connected with the line 23 of the sector c while as before the line 24 of the sector a and the line 25 of the sector d are connected to the terminal 20. Thus the coils of the several sectors may be connected in pairs to operate in a 110 volt circuit or in series for use in a 220 volt circuit.

In the construction shown in Fig. 1, each sector has the turns of the coil arranged in two duplicate groups, the group 10, 12, 14 and 16 being consecutively wound for thirty, forty, fifty and sixty ampere turns and the group 11, 13, 15, 17 being likewise arranged and thus each sector is formed of two portions of the winding which gradually increase in number of conductors from one slot to another which is productive of the effect as hereinafter more fully described.

In Fig. 2 is shown a different arrangement of the coil for a sector or magnetic pole of the stator in which the number of conductors in the successive slots gradually increase from the least to the greatest in one single group for the several sections which form the coil. The general effect of the winding as will hereinafter be more fully described is practically the same as results from the arrangement shown in Fig. 1 but there are nine slots for each pole instead of the eight slots in the construction shown in Fig. 1.

In Fig. 2 I have shown the usual form of the slotted stator ring, the slots being all of equal depth but the coil arrangement for a pole differs from the usual construction in the number of conductors in the successive slots. The coils for each pole in either of the forms shown both produce a constant displacement of the center of magnetic pressure due to alternations in the supplied current and there are undoubtedly other arrangements of the coil possible or variations in the stator construction and coil in which this same constant displacement of the center of the magnetic pressure may be produced and except where specifically including the special form of stator the appended claims are intended to involve the arrangement of the winding productive of this effect.

This change in center of magnetic pressure due to alternations of current is produced by the described winding as follows:

Take the arrangement shown in Fig. 1. When the first rush of current passes through the coils all four coils for the sectors or poles a, b, c, d will be similarly magnetized first to the extent of thirty ampere turns in each of the slots. Providing the coil is wound with the number of conductors as described relative to Fig. 1 and the diagram of Fig. 3, that is, each slot at 10, 12, 14, 16 and 11, 13, 15 and 17 of Fig. 1 all contain at least thirty conductors and the center of the magnetic effect or pressure is at the blank space between the slots 11 and 16 at the center of the group. As the flow continues in this first inrush of current the number of conductors in the slots 12 and 13 being of a greater number begin to increase the magnetic effect at a point centrally therebetween, that is, somewhat to the right of the exact center of the eight slots, then the same condition takes place due to the greater number of conductors in the slots marked 14 and 15 and likewise due to the still greater number of conductors the highest magnetic effect is finally attained at the center between the position of the coils in the slots 16 and 17.

Now, as the current changes its polarity due to the alternations the mass of iron between the sixty conductors at 16 and 17 and due to its being the most highly magnetized section of the pole does not demagnetize as rapidly as the mass of iron between the thirty conductor portion of the coil at 10 and 11 and thus the iron between the sections of the coil at 10 and 11 becomes demagnetized first and remagnetized under the opposite polarity of the current alternation.

The mass of iron between the portions of the coil in slots 12 and 13 remagnetizes a step behind that between the portions of the coil in slots 10 and 11 and this reluctance or resistance to change is increased between the slots 14 and 15 and is the greatest between the slots 16 and 17 and thus, in the recurring remagnetization of the mass of iron between the centers of the said pairs of turns or portions of the coil, the center of magnetic pressure is shifted circumferentially at each pole and causes rotation of the rotor in which counter currents are induced. Thus it will be evident that I have made the discovery that, although the successive positions of the coil are in series, due to there being a different number of conductors in each slot, the magnetic effect thereof in the successive pairs of slots is not in phase due to the increased amount of inductance in the successive pairs.

Therefore by a single winding I have been able to secure a polyphase effect and as this magnetic center is caused to shift circumferentially in each of the sectors in the same direction, the rotor (which may be the ordinary squirrel cage type) is caused to turn in the same direction as shown by the arrow in Fig. 1 and to constantly turn in such direction due to the alternations in the current which successively causes displacement of the center of magnetic pressure. It will thus be seen that there is no starting coil necessary as the rotor will start to rotate due to the first current alternation causing the center of magnetic pressure at each pole to move circumferentially of the stator, and the starting torque is sufficiently high as to be of service in many installations in which the load is not great as for instance in fan motors.

However, there are many uses for an electric motor, as for instance in direct connection with a compressor in electric refrigerators, in which the load is sufficiently great as to make this motor at least reluctant to start. In order to eliminate difficulty in starting the motor in such installations I have shown the rotor 30 as being mounted for rotation on the shaft 30ª which shaft is connected for operation of some device as for instance a compressor (not here shown). Under this rotative relation of the rotor and the shaft, the rotor is free to start without the use of commutators, starting coils etc., and as soon as it has started and attained a predetermined speed a clutch device is provided to connect the rotor with the shaft to cause the shaft to turn therewith. This clutch may be of any desired form.

Figure 4:
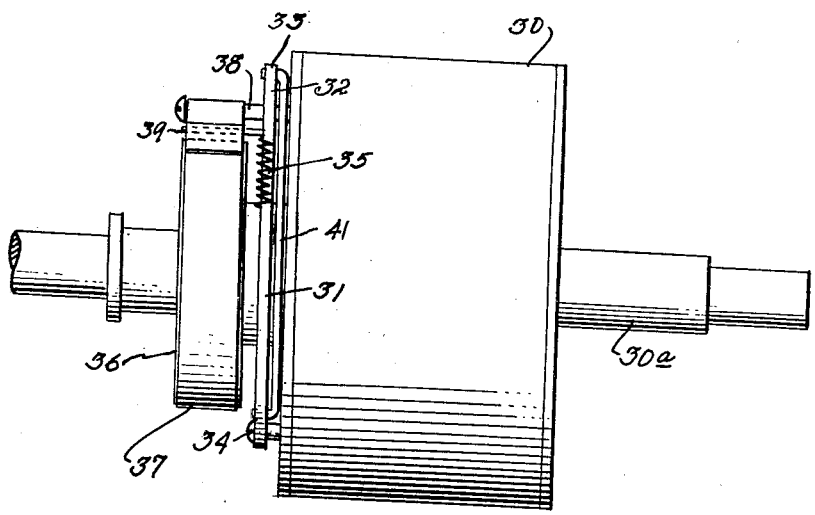
Fig. 4 is an elevation showing the rotating armature and a clutch device by means of which the armature may be secured to the shaft, being one of the forms of rotor with which my improved winding may be utilized.

For illustrative purposes I have shown a centrifugal clutch which consists of two arms 31 and 32 pivotally supported on the end of the rotor as shown in Fig. 4, the arm 32 being pivoted at 38 while the arm 31 is pivoted at 34 and the free end of the arm 31 is connected by a light spring 35 to the arm 32. A tie rod 41 has one end connected at 33 to the arm 32 and has its opposite end connected to the arm 31 so that outward movement of the free ends of the arms will cause the brake band to tighten as will be hereinafter described. The shaft 30a has fixed thereto a disk 36 about the cylindrical periphery of which is a brake band 37 having one end attached to the said arm 32 at the point 38 and the other end attached to said arm at its point 39 so that in movement of the free end of the arms 31 and 32 outwardly through centrifugal force the band is caused to tighten on the disk.

By a proper construction of these arms and tension of the spring 35 this clutch may be made to operate at any desired speed but preferably the rotor should be clutched to the shaft when the rotor has attained a speed of six to eight hundred R. P. M. at which point the rotor is capable of taking its full load.

I have thus described a convenient arrangement of the armature and shaft and clutch mechanism but the clutch may be dispensed with as previously stated and the armature fixed to the shaft in which arrangement of the parts the motor is self-starting under a minor load such, for instance, as operation of a fan or other element in which the resistance to rotation is comparatively slight.

It will be noted that in both the form shown in Fig. 1 and the form shown in Fig. 2 the number of conductors in each slot of each pole increases in the direction of rotation of the rotor and that in Fig. 1 the coil for each pole is arranged in two parts each increasing in number of conductors in the same manner while in the arrangement of the coil in Fig. 2 the increase is through the entire number of slots for the sector, the effect, however, is substantially the same in both cases. In the form shown in Fig. 2, assuming that there are twenty ampere turns in the slot 50 and the number of conductors increases in each of the slots up to say eighty, for example, in the last slot 51 of the series of slots, the successive remagnetizing of the iron through current alternations has substantially the same result.

Due to there being greater magnetic intensity in the iron influenced by the greatest number of conductors of the sectors, the center of magnetic pressure will be caused to change its circumferential position in the same general manner as is the case with the construction shown in Fig. 1. The only difference in the structure shown in Fig. 1 from that shown in Fig. 2 is that a greater mass of iron may be utilized. The coils of each of the sectors of either form of stator are reversed in direction of wind to provide the successive north and south poles.

It will be realized from the foregoing that the flow of current in the sector $a$ is left hand and in sector $b$ is right hand, is again left hand in sector $c$ and right hand in sector $d$. By this arrangement also it will be noted that all the slots containing sixty conductors are directly connected together as is the case with the slots containing the different number. This simplifies the labor involved in winding.

In either of the forms shown the winding may be termed a "saw tooth" winding, that is, beginning at one side of a sector the winding in the slots is of increased radial depth and the number of conductors increase toward one side of the sector. Pyramidal winding has been utilized heretofore but in such winding the greatest number of conductors or mass of wire is at the center of the sector and therefore requires a secondary coil to start the motor as it is necessary to change the position of the center of magnetic pressure, the starting coil and the running coil of such prior pyramidal winding being out of phase.

I have accomplished the same general result in change in position of the center of the magnetic pressure in a single coil the sections of which are out of phase and productive of this circumferential shift of center of magnetic pressure without any of the instrumentalities required where a secondary winding is utilized such as commutators with the undesirable arcing effect and the cost involved in the provision of such secondary coil, commutators etc., as previously stated and have secured a motor of much higher running torque.

It will be evident from the foregoing description that my improved motor is of greatly simplified form and reduced cost of manufacture in comparison with previous types of motors of this class and that the various objects of the invention are attained principally by reason of the winding of the coil of each sector in what I have heretofore termed the "saw tooth" form wherein the turns in each slot of the stator increase in number toward one side of each sector or magnetic pole of the stator.

Having thus fully described my invention, its utility and mode of operation, what I claim and desire to secure by Letters Patent of the United States is—

1. In an alternating current motor, a rotor and a stator, one of which is provided with a series of radial slots extending thereabout, a single field winding wound through the series of slots to provide a plurality of magnetic pole pieces each having at least four slots, the said slots varying from a lesser to a greater depth from one side of a pole toward the other in which successive sections of the coil differ in number of conductors from a lesser number in the slot of the least depth to successively greater number of conductors as the slots increase in depth to thereby provide a winding by which the center of magnetic intensity is constantly varied in position circumferentially of the slotted member due to constant change in polarity of the supplied current.

2. In an alternating current motor, a rotor and a stator, one of which is provided with a series of radial slots extending in practically equi-distantly spaced relation about the face thereof opposing the face of the other, a single coil wound through the series of slots in such manner that the field is separated into a plurality of magnetic pole pieces each having more than two slots, the sections of the coil in successive slots of each pole piece differing in number of conductors from a lesser number at one side of the pole to a successively greater number in successive slots toward the opposite side whereby through alternations in the supplied current the center of magnetic pressure of each pole piece is changed in position in step with the current alternations and in the direction in which the rotor turns.

3. In an alternating current motor, a rotor, a stator provided with a plurality of magnetic pole pieces occupying practically the entire inner periphery of the stator, each pole piece having a plurality of radial slots, a field winding for the stator consisting of a single coil wound successively in the slots of each pole piece, the conductors in the successive slots of each pole piece increasing in number and causing rotation of the rotor in the direction of increase in the number of conductors through change in polarity at each pole piece causing change in position of the center of magnetic pressure, said change in number of conductors in successive slots being approximately ten.

4. In an alternating current motor, a rotor, a stator provided with a plurality of magnetic pole pieces, each pole piece having a plurality of radial slots providing at least three teeth of approximately the same pole face area, a field winding for the stator consisting of a single coil wound successively in the slots of the pole pieces, the number of conductors in the successive slots of a pole piece increasing from a lesser to a greater number in succession circumferentially of the field in the direction of the desired rotation of the rotor, the arrangement providing that due to the change in polarity by the successive alternations in the supplied current, the center of magnetic pressure is caused to change in position relative to the mathematical center of the pole pieces circumferentially of the field in step with the current alternations.

5. In an alternating current motor, a rotor, a stator provided with a plurality of magnetic pole pieces, each pole piece having a plurality of radial slots, a field winding for the stator consisting of a single coil wound successively in the slots of the pole pieces, the winding in the slots of each pole being in two groups, the ampere turns in each group increasing in number from a lesser to a greater circumferentially of the field in the direction of the desired rotation of the rotor whereby, due to the change in polarity by the successive alternations in the supplied current the center of the magnetic pressure is caused to change in position relative to the mathematical center of the pole piece circumferentially of the field in step with the current alternations.

6. In an alternating current motor, a rotor, a stator provided with four magnetic pole pieces, each having at least four radial slots and occupying practically the entire inner periphery of the stator, a field winding for the stator consisting of a single coil wound successively in the slots of the pole pieces, the number of conductors in the successive slots of each pole piece increasing in number in the direction of the desired rotation of the slots providing a structure in which the center of magnetic pressure is changed in position relative to the mathematical center of the pole piece circumferentially of the field in step with the current alternations causing change in polarity.

7. In an alternating current motor, a rotor, a stator provided with a plurality of magnetic pole pieces, each having a plurality of radial slots, the said slots varying in depth, there being two groups in each pole piece of similar varying depths from least to greatest, a field winding for the stator consisting of a single coil wound successively in the slots of the pole pieces, the conductors increasing in number in each slot successively from the slot of least to greatest depth and causing rotation of the rotor in the direction of increase in number of conductors whereby, due to change in polarity by the successive alternations in supplied current, the center of magnetic pressure is caused to change in position in step with the current alternations.

EARL P. OSWALD.